May 17, 1966  J. TURTSCHAN  3,251,133
SURFACE GAUGE FOR MEASURING, CHECKING AND MARKING
DISTANCES ON WORK PIECES
Filed July 23, 1963  2 Sheets-Sheet 1
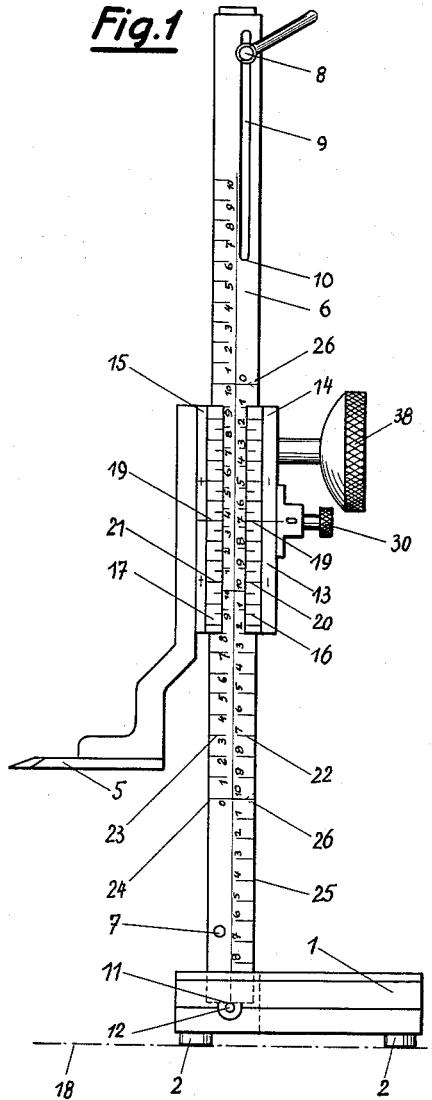
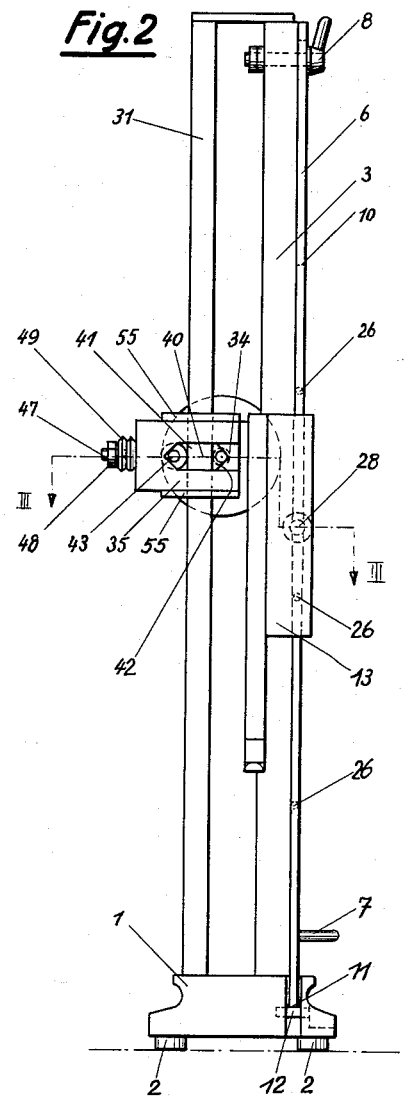
INVENTOR.
Josef Turtschan
BY Lowry & Rinehart
ATTYS.

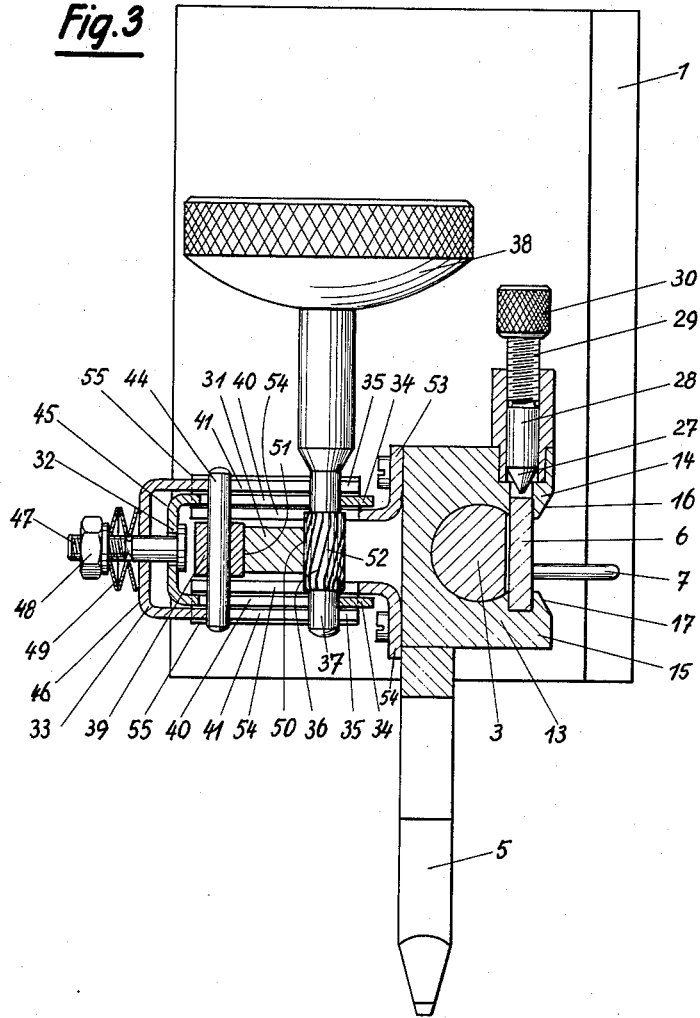

3,251,133
SURFACE GAUGE FOR MEASURING, CHECKING AND MARKING DISTANCES ON WORK PIECES
Josef Turtschan, 41 Böheimstrasse, Stuttgart, Germany
Filed July 23, 1963, Ser. No. 297,120
9 Claims. (Cl. 33—169)

This invention relates to a surface gauge, particularly a vernier height gauge, comprising a graduated slide adjustably movable in consecutive intervals on a vertical bar, and a slide block slidably movable on the bar in relation to the graduated slide.

The object of the invention is the provision of an instrument which will permit measurements given by reference to a basic measurement to be gauged, checked or marked out by scribing without the need of performing the required additions and subtractions arithmetically. Moreover, the proposed surface gauge is to be an instrument of the highest precision, of simple construction and easy to operate.

Whereas known instruments of the specified kind are provided with means for coarse and fine adjustment, the only adjusting means for the slide block provided in the instrument according to the present invention is a cylindrical friction roller which is connected to the slide block and adapted to roll under spring pressure on a smooth rail separate from and extending parallel to the bar, and which merely by friction firmly retains the slide block in any position to which it is set on the bar.

More particularly, the friction roller which is rotatable by a hand wheel as well as a cooperating backing roller which presses against the opposite side of the rail are mounted between the shanks of two interposed U-shaped stirrup members with relatively spaced shanks, which embrace the rail from the side remote from the bar, and which can be elastically pulled together by spring pressure for the rollers to grip the rail firmly between them.

Moreover, it is proposed to provide the slide block with an arresting pin and the graduated slide with a plurality of equidistantly spaced notches or centering depressions to permit the graduated scale to be precisely preset with reference to the slide block.

Compared with conventional instruments of the specified kind comprising coarse and fine adjusting means incorporating racks, lead screws, micrometer screws and the like the form of construction proposed by the present invention has the advantage that a single adjusting element which requires no guide means of a particular and specially prepared section is sufficient for guiding the slide block in an elastically self-compensating way without backlash. Moreover, a highly precise cooperation between the slide and the slide block is achieved by the simplest of means.

A preferred embodiment of the invention will now be described by way of example and with reference to the accompanying drawings, in which:

FIG. 1 is a front elevation of a vernier height gauge according to the invention;

FIG. 2 is a side elevation thereof, and

FIG. 3 is a section taken on the line III—III in FIG. 2, shown on a larger scale.

With reference to FIGS. 1 and 2 it will be seen that the instrument stands on a baseplate 1 provided with slipper blocks 2 and surmounted by a vertical bar 3 carrying a slide block 13 with a scriber 5. A graduated slide 6 with a handle 7 is slidably displaceable on the bar 3 and can be located by tightening a clamp 8.

The clamp 8 passes through a longitudinal slot 9 in the slide 6. The slide 6 can be raised until the bottom end 10 of the slot 9 strikes the clamp 8 and it can be lowered until the bottom end 11 of the slide 6 strikes a pin 12 in the baseplate 1.

The slide block 13 is slidable on the bar 3 and has edges 14, 15 forming a slideway embracing the slide 6. Two bevel faces 16 and 17 are formed on the slideway edges 14 and 15 and slope inwards towards the surface of the slide 6. These bevel faces 16 and 17 carry index marks 19 at equidistant vertical intervals above the reference plane 18 defined by the underfaces of the slipper blocks 2. Above and below these index marks 19 are like vernier graduations 20 and 21. The index marks 19 and the vernier graduations 20 and 21 cooperate with two adjacent scales 22 and 23 on the slide 6. The zero lines of the two scales 22 and 23 coincide but the numbering of the divisions of the left hand scale 23 is in upwardly ascending order, whereas that on the right hand scale 22 progresses inversely in the downward direction.

The numbering of the cooperating vernier graduations 21 and 20 is correspondingly arranged. The numbering of the scales on the slide 6 is not continuous but periodically repeats itself at distances equal to the scale interval.

The instrument is so contrived that when the slide block 13 is in its basic position, that is to say when the scriber 5 is in the reference plane 18 and the slide 6 is in its completely lowered position, the slide block can be arrested on the slide 6. A zero line 24 on the scales 22 and 23 indicates this basic position.

For thus arresting the slide block 13 the slide 6 is provided at equidistant intervals on one of its edges 25 with short coned depressions or notches 26 which cooperate with the similarly coned point 27 of a pin 28 on the slide block 13. This pin 28 has an external thread 29 and a knurled head 30, so that it can be easily unscrewed and retightened for engagement of one of the notches 26 in the slide 6 to arrest the slide block in the corresponding position.

The intervals between the arresting notches 26 exactly correspond with the above mentioned scale interval. Consequently, the positions in which the slide block is thus arrestable also exactly correspond to the zero points on the scales 22 and 23.

For moving and adjusting the slide block 13 on the bar 3 a self-braking adjusting means is provided. This substantially consists of a vertical rail 31 affixed to the baseplate 1 and extending parallel to the bar 3 to which it is firmly connected at the top, and of a cursor adapted to run up and down this rail and constructed as follows:

The shanks 34 and 35 of two U-shaped stirrups 32, 33 embrace the vertical rail 31 from one side in such manner that the inside stirrup 32 is closely adjacent the outer stirrup 33 but more widely spaced from the sides of the rail 31. The shanks 34 of the inner stirrup 32 carry the shaft 37 of a friction roller 36 with a handwheel 38, whereas the shanks 35 of the outer stirrup 33 carry a backing roller 39.

For mounting the rollers, the shanks 34 and 35 of the stirrups are provided with slots 40 and 41, each at its end forming a triangular bearing surface 42 and 43 for the shaft 37 of the friction roller 36 and the shaft 44 of the backing roller 39 respectively. Moreover, the slots 40 and 41 are so contrived that they can freely accommodate the two shafts 44 and 37.

A threaded bolt 47 which carries a nut 48 and a dished spring 49 and which passes through the heads 45 and 46 of the stirrups 32 and 33 permits the two stirrups to be elastically pulled together and the friction roller 36 to be tightened against one side 50 and the back roller 39 against the other side 51 of the rail 31.

The friction roller 36 is provided with a profiled surface in the form of blunt helical teeth 52. The roller itself preferably consists of a harder material than that of the rail 31.

The friction engendered when the friction roller 36 and the backing roller 39 roll down the rail 31 and the friction of the shafts 37 and 44 in their V-shaped bearings 42 and 43 generate sufficient resistance to lock the cursor on the rail in any position. Means for arresting the monkey 13 in a desired position on the bar 3, as are usually provided, can therefore be completely dispensed with.

The slide block 13 is connected to the cursor (32 to 49) to ensure its participation in any movement of the cursor without any backlash. To this end the slide block 13 is provided with two lateral angle pieces 53 and 54 with flat shanks which project with clearance on each side between the rail 31 and the stirrup 32. The two projecting shanks of the angles 53 and 54 are formed with laterally projecting flanges 55 which closely embrace the shanks 34 and 35 of the stirrups 32 and 33 from above and below with a good contact fit.

This arrangement which can be quite generally used for slidably movable members on vertical spindles couples the slide block 13 with the cursor without the slightest backlash so that, apart from permitting very precise adjustments to be made, the slide block will be automatically held by the cursor in any position.

The described vernier height gauge according to the invention is used as will now be described:

The slide block 13 and the slide 6 are first placed into their primary positions. Owing to the setting of the gauge the scales 22 and 23 should then give a zero reading. While the slide 6 remains clamped, the slide block 13 is raised by the adjusting cursor to the prescribed reference height. In so doing the operator must bear in mind that the scale interval repeats itself. When the adjustment has been made a line at the required level can be scribed for instance on a workpiece. If it is now desired to mark out a second line at a given distance above this reference line, the slide 6 is first freed by releasing the clamp 8 and raised by means of its handle 7 until the index lines 19 on the slide block 13 register with a first zero line on the scales 22 and 23. The slide block 13 will not move during the further operation because it is securely held by the self-locking cursor. In this position the slide block 13 is coupled to the slide 6, as described, by engagement of the arresting pin 28 and the corresponding notch 26 in the slide 6. The fresh starting position of the slide block 13 in relation to the slide 6 is thus precisely established.

The slide 6 is now clamped to the bar 3 again by the clamp 8 and, when this has been done, the arresting pin 28 is released. The required distance of the further line from the previously scribed reference line can now be found by moving the slide block 13 by reference to the scale 23. If the fresh line is above the scribed line, the scale 23 is used, because this is an additive scale progressing in the upward direction. The position of the fresh line for marking has thus been found.

It will have been understood that the height of the fresh line has been found without actually arithmetically adding the original reference measurement and the further distance together. However, if it is desired to check the accuracy of the fresh position by reference to the arithmetically calculated sum of the two measurements the clamp 8 can be released and the slide 6 lowered to the pin 12 in the baseplate 1. The calculated total measurement must then agree with the reading given on the left hand scale 23.

The same procedure is adopted when a fresh measurement is required to be deducted from a primary reference measurement. However, in such a case readings are taken on the inverted right hand scale 22 instead of on the ascending scale 23. After release of the clamp 8 the slide 6 is raised or lowered to the next arresting point and the accuracy of the relative positions of the slide block 13 and the slide 6 established by means of the knurled head 30. After release of the engaging arresting pin 28 the slide block 13 is lowered until the required position is reached.

As will now be readily understood the provision of a plurality of arresting points and coordinated scales which are repetitively numbered within equal scale intervals is a major advantage afforded by the gauge according to the invention.

As has been explained, measurements representing additions and subtractions in relation to a reference measurement can therefore be set by moving to the next scale interval. Consequently the slide 6 need only be moved through shorter distances instead of, as would otherwise be required, through the sum of the distances. In a precision instrument this has the major structural advantage of ensuring that the guiding surfaces between the bar 3 and the slide 6 are always sufficiently long without the necessity of providing a bar and a slide of considerable length.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A surface gauge for measuring, checking and marking distances on work pieces, particularly a vernier height gauge, comprising a bar, a graduated slide adjustably movable in intervals on said bar, an adjustable slide block slidably movable on the bar in relation to the graduated slide, and a cylindrical friction roller connected to the slide block and adapted to roll under elastic pressure on a smooth rail which is separate from and extending parallel to the bar, said cylindrical friction roller having a profiled surface for firmly retaining and locking the slide block in any position on the bar and constituting the only means for the adjustment of the slide block, the friction roller being rotatable by a hand wheel and a backing roller bearing against the opposite side of the smooth rail, said friction roller and backing roller being mounted between the shanks of two interposed U-shaped stirrup members which have spaced web portions and embrace the smooth rail on its side remote from the bar and being elastically pulled together for the rail to be elastically gripped between the two rollers.

2. A surface gauge according to claim 1, wherein the shanks of the stirrup members are each provided with a horizontal slot forming V-shaped bearing surfaces for the shafts of the rollers at opposite ends of the slots.

3. A surface gauge according to claim 2, wherein two angle pieces are secured to the slide block and project between the inside of the shanks of the inner stirrup member and the free sides of the smooth rail, said angle pieces being provided with openings for the passage therethrough of the roller shafts and formed with lateral flanges which embrace the top and the bottom of the U-shaped stirrup members in a close fit.

4. A surface gauge for measuring, checking and marking distances on work pieces, particularly a vernier height gauge, comprising a bar, a graduated slide adjustably movable in intervals on said bar, an adjustable slide block slidably movable on the bar in relation to the graduated slide, a cylindrical friction roller connected to the slide block and adapted to roll under elastic pressure on a smooth rail which is separate from and extending parallel to the bar, said cylindrical friction roller having a profiled surface for firmly retaining and locking the slide block in any position on the bar and constituting the only means for the adjustment of the slide block, and blunt helical teeth being provided around the periphery of the friction roller.

5. A surface gauge for measuring, checking and marking distances on work pieces, particularly a vernier height gauge, comprising a bar, a graduated slide adjustably movable in intervals on said bar, an adjustable slide block slidably movable on the bar in relation to the graduated slide, and a cylindrical friction roller connected to the slide block and adapted to roll under elastic pressure on a smooth rail which is separate from and extending parallel to the bar, said cylindrical friction roller having a profiled surface for firmly retaining and locking the slide block in any position on the bar and constituting the only means for the adjustment of the slide block, the material of the friction roller being harder than that of the smooth rail.

6. A surface gauge according to claim 1, wherein the friction roller and the backing roller are both loaded by a common spring in the form of a dished spring.

7. A surface gauge for measuring, checking and marking distances on work pieces, particularly a vernier height gauge, comprising a bar, a graduated slide adjustably movable in intervals on said bar, an adjustable slide block slidably movable on the bar in relation to the graduated slide, and a cylindrical friction roller connected to the slide block and adapted to roll under elastic pressure on a smooth rail which is separate from and extending parallel to the bar, said cylindrical friction roller having a profiled surface for firmly retaining and locking the slide block in any position on the bar and constituting the only means for the adjustment of the slide block, said slide block being equipped with a movable arresting pin for cooperation with depressions equidistantly located in the graduated slide for accurately positioning the slide in relation to the slide block, the slide being locatable at any height on the bar by a clamp.

8. A surface gauge according to claim 7, wherein the slide has two equal scale graduations between consecutive arresting points, one scale graduation being inverted in relation to the other, and there being a common zero position to both directions of measuring.

9. A surface gauge for measuring, checking and marking distances on work pieces, particularly a vernier height gauge, comprising an upright standard, a graduated slide adjustably movable in intervals on said upright standard, an adjustable slide block slidably movable on the upright standard in relation to the graduated slide, and a cylindrical friction roller resiliently supported by the slide block and adapted to roll under elastic pressure of a spring device on a smooth rail which is separate from and extending parallel to the upright standard, said cylindrical friction roller having a surface profiled for firmly retaining and self-locking the slide block in any position on the upright standard and constituting the only means for adjustment of the slide block.

References Cited by the Examiner

UNITED STATES PATENTS

| 1,469,944 | 10/1923 | Merrill | 33—111 |
| 2,670,542 | 3/1954 | Hull | 33—169 |
| 2,844,878 | 7/1958 | Zwierzynski | 33—170 |
| 3,069,778 | 12/1962 | Schiler | 33—174 |
| 3,176,406 | 4/1965 | Williams | 33—170 |

FOREIGN PATENTS

| 26,319 | 7/1904 | Great Britain. |
| 535,838 | 4/1941 | Great Britain. |

ISAAC LISANN, *Primary Examiner.*

F. H. THOMSON, *Assistant Examiner.*